(12) United States Patent
Danilak (10) Patent No.: US 7,616,206 B1
(45) Date of Patent: Nov. 10, 2009

(54) EFFICIENT MULTI-CHIP GPU

(75) Inventor: Radoslav Danilak, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 530 days.

(21) Appl. No.: 11/454,543

(22) Filed: Jun. 16, 2006

(51) Int. Cl.
*G06F 15/17* (2006.01)
*G06F 13/20* (2006.01)

(52) U.S. Cl. .................................... 345/505

(58) Field of Classification Search .......... 345/502–505
See application file for complete search history.

(56) References Cited

U.S. PATENT DOCUMENTS

| | | | | |
|---|---|---|---|---|
| 7,525,548 B2* | 4/2009 | Azar et al. | ................. | 345/504 |
| 2006/0267992 A1* | 11/2006 | Kelley et al. | ................. | 345/502 |
| 2007/0103590 A1* | 5/2007 | Azar et al. | ................. | 348/459 |
| 2007/0139422 A1* | 6/2007 | Kong et al. | ................. | 345/502 |
| 2007/0139423 A1* | 6/2007 | Kong et al. | ................. | 345/502 |

* cited by examiner

*Primary Examiner*—Jeffery A Brier
(74) *Attorney, Agent, or Firm*—Patterson & Sheridan, LLP (57) ABSTRACT

One embodiment of the invention sets forth a technique for efficiently combining two graphics processing units ("GPUs") to enable an improved price-performance tradeoff and better scalability relative to prior art multi-GPU designs. Each GPU's memory interface is split into a first part coupling the GPU to its respective frame buffer and a second part coupling the GPU directly to the other GPU, creating an inter-GPU private bus. The private bus enables higher bandwidth communications between the GPUs compared to conventional communications through a PCI Express™ bus. Performance and scalability are further improved through render target interleaving; render-to-texture data duplication; data compression; using variable-length packets in GPU-to-GPU transmissions; using the non-data pins of the frame buffer interfaces to transmit data signals; duplicating vertex data, geometry data and push buffer commands across both GPUs; and performing all geometry processing on each GPU.

20 Claims, 6 Drawing Sheets

EFFICIENT MULTI-CHIP GPU

BACKGROUND OF THE INVENTION

1. Field of the Invention

Embodiments of the present invention relate generally to the field of computing devices and more specifically to a technique for efficiently implementing a multi-chip Graphics Processing Unit.

2. Description of the Related Art

Unless otherwise indicated herein, the approaches described in this section are not prior art to the claims in this application and are not admitted to be prior art by inclusion in this section.

Figure 1:
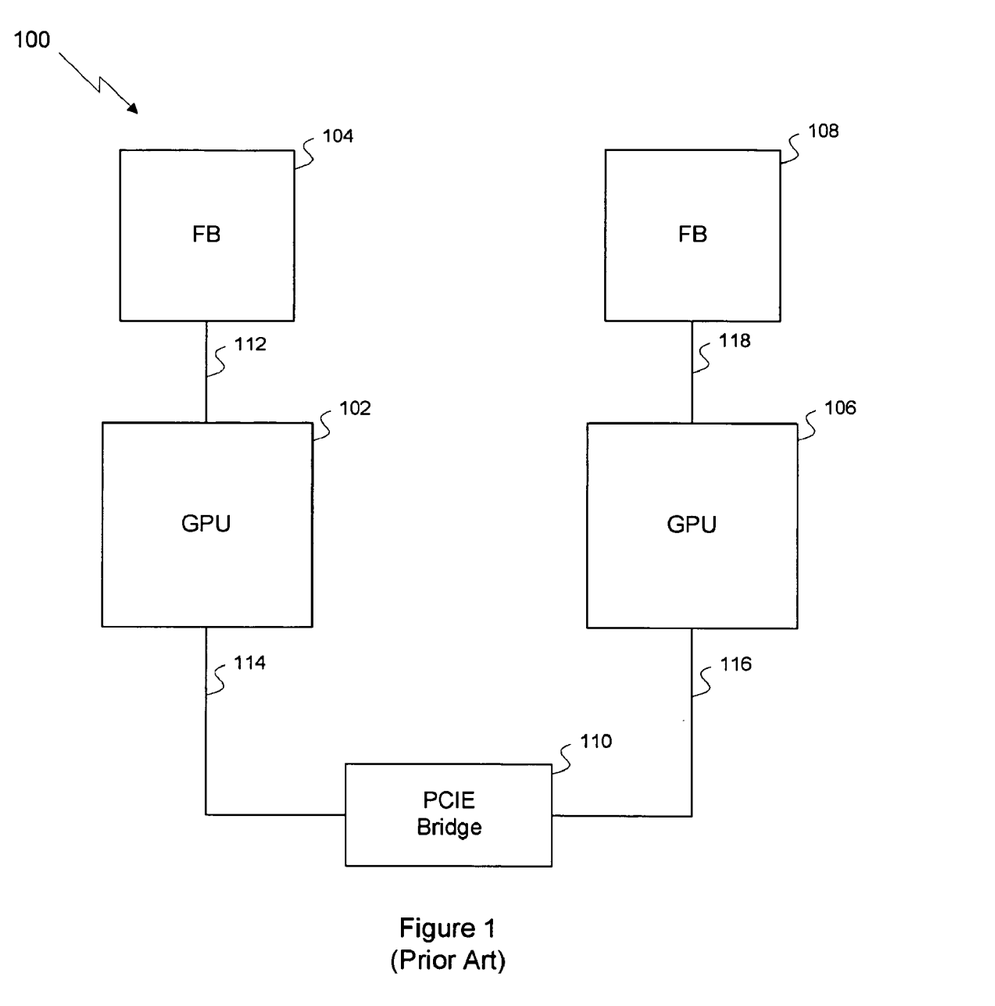
FIG. 1 illustrates a prior art graphics system that includes two GPUs communicating over a PCIE bus.

To meet the ever increasing demands for realism, quality, and real-time interactivity of displayed images and videos in graphics applications, one solution is to use multiple graphics processing units ("GPUs") in a graphics system. FIG. 1 illustrates a prior art graphics system 100 including two GPUs communicating over a PCIE bus. As shown, the graphics system 100 includes GPUs 102 and 106, frame buffers 104 and 108, and a PCIE bridge 110. The memory bus 112 couples the frame buffer 104 to the GPU 102, and the memory bus 118 couples the frame buffer 108 to the GPU 106. Each of the memory busses 112,118 provides an approximate bandwidth of 100 GB/s. PCIE busses 114,116 couple the PCIE bridge 110 to the GPUs 102,106, respectively.

Using the scalable link interface ("SLI") technology developed by Nvidia Corporation of Santa Clara, Calif., the two GPUs in graphics system 100 typically take on processing tasks in a master and slave arrangement to produce a single output. The interfaces between the GPUs and the video memory modules, such as memory interfaces 112 and 118, operate at up to 100 Gigabytes ("GB") per second. PCIE busses typically support 16 lanes and each lane supports a data rate of 500 Megabytes ("MB") per second. Each PCIE bus 114,116 typically supports 16 lanes and thus operates at up to 8 GB per second.

Certain operations supported by the SLI technology further highlight these performance issues. They are: the split-frame rendering ("SFR"), the alternative-frame rendering ("AFR"), and the SLI anti-aliasing operations. Suppose GPU 102 is the master GPU in graphics system 100, and GPU 106 is the slave GPU. In the SFR mode, GPU 102 is responsible for the top section of the screen, and GPU 106 is responsible for the bottom section. Although each GPU in an SLI configuration generally maintains its own copy of all local resources without having to share with the other GPU, any change to a texture render target needs to be broadcast to all other GPUs. The performance penalty related to this broadcast is further exacerbated by the discrepancy between the data rates of memory interfaces 112,118 (i.e., at approximately 100 GB/s) and the PCIE busses 114,116 at approximately 4 GB/s).

In the AFR mode, GPU 102 works on the odd frames, and GPU 106 independently works on the even frames. Because of this alternating mechanism, the GPU responsible for a frame that is not self-contained pushes the necessary data to the other GPU to operate on the next frame. A self-contained frame is a frame that shares little to no data among the multiple GPUs in the AFR mode. In other words, if frame 1 incorporates certain texture render targets that are needed in the subsequent frame (in other words, frame 1 is not self-contained), then GPU 102 pushes the texture data to GPU 106 to operate on frame 2. Similar to the discussions above, the transferring of such texture data, especially via the relatively inefficient data transfer path, introduces overhead and reduces the throughput of graphics system 100.

In the SLI anti-aliasing mode, each GPU renders the same frame, except the two frames are offset by half of a pixel. Additional image quality improvements may be realized by further duplicating, offsetting and overlaying additional full screen images. The drawback with AASLI, however, is that little improvement in image quality is realized by using more than two GPUs, especially in light of the cost associated with each additional GPU. Also, with this technique, overall rendering speed is not necessarily increased.

Furthermore, unless the load balancing between the two GPUs is done flawlessly, the GPUs are unlikely to complete their given tasks at the same time at all times. Also, the GPUs need to be synchronized so that the proper frame is displayed at the appropriate time. As has been shown, the overhead of performing load balancing, synchronization, and data exchanges via inefficient data transfer paths between the graphics adapters all contribute to reducing the overall throughput of graphics system 100 to be less than twice that of a single graphics adapter.

Yet another drawback of these three SLI techniques is that they rely on the relatively slow PCIE bus for data transmissions between the two GPUs. This structure causes problems in situations where relatively large amounts of data need to be transmitted quickly between the two GPUs, such as when data rendered by one GPU is used as texture data by the other GPU. Because this data cannot be transmitted quickly enough over the PCIE bus, typical SLI systems are designed with frame buffers large enough to store the images being rendered by both GPUs so that these types of transmission can be avoided. Using larger frame buffers can increase the cost of a two GPU system by upwards of fifty percent.

As the foregoing illustrates, what is needed in the art is a multi-GPU graphics system that offers a better price-performance tradeoff than prior art graphics systems and is scalable beyond two GPUs to realize further performance advantages.

SUMMARY OF THE INVENTION

One embodiment of the invention sets forth a system for processing graphics data. The system includes a first graphics processing unit supporting a first initial memory interface to communicate with a first frame buffer, where the first graphics processing unit is configured to store a set of vertex data and a set of push buffer commands in the first frame buffer and to process the vertex data by executing one or more of the push buffer commands, a second graphics processing unit supporting a second initial memory interface to communicate with a second frame buffer, where the second graphics processing unit is also configured to store the set of vertex data and the set of push buffer commands and to process the vertex data by executing one or more of the push buffer commands, and a private bus that couples the first graphics processing unit to the second graphics processing unit and includes a portion of the first initial memory interface and a portion of the second initial memory interface. The first frame buffer is configured to store a first set of rendered tiles, and the second frame buffer is configured to store a second set of rendered tiles. The first frame buffer is further configured to store at least one tile in the second set of rendered tiles, and the second frame buffer is further configured to store at least one tile in the first set of rendered tiles.

One advantage of the disclosed system is that the cost-performance ratio of the system may be much more favorable than that of prior art multi-GPU systems, such as SLI-based multi-GPU systems. Another advantage of the disclosed system is that it is more scalable that an SLI system because the graphics bandwidth through the PCIE bus has been greatly reduced through use of private bus communications between pairs of GPUs. This may allow a graphics system to include multiple pairs of GPUs, with intra-pair communications over intra-pair private busses and inter-pair communications over the PCIE bus. Thus, the disclosed system may be scaled beyond two GPUs more readily than prior art SLI-based multi-GPU systems.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As previously described, the relatively low bandwidth of the PCIE bus may substantially limit the graphics performance of a graphics system with two GPUs coupled together using a PCIE bus, such as the three prior art systems described above. One embodiment of the invention sets forth a two GPU graphics system where the 100 GB/s memory interface of each GPU is split into two parts. The first part is a 75 GB/s memory interface coupling the GPU and its respective frame buffer, and the second part is a 25 GB/s memory interface coupling together the two GPUs and creating an inter-GPU private bus. Although the performance of the private bus compares favorably to that of a PCIE bus, 25 GB/s may still be somewhat limiting for certain graphics applications such as video games or animation programs. Therefore, several features have been added to the invention which further improve the effective bandwidth of the private bus or reduce the memory traffic between the two GPUs to increase the overall performance of the two GPU system. These features include render target interleaving; render-to-texture data duplication; data compression; variable length packet protocol; using non-data signals for transmitting data; storing all vertex data, geometry data and geometry-related push buffer commands in the frame buffer of each GPU; and utilizing each GPU to perform all geometry processing. The invention and each of these features are described in the following paragraphs.

Figure 2:
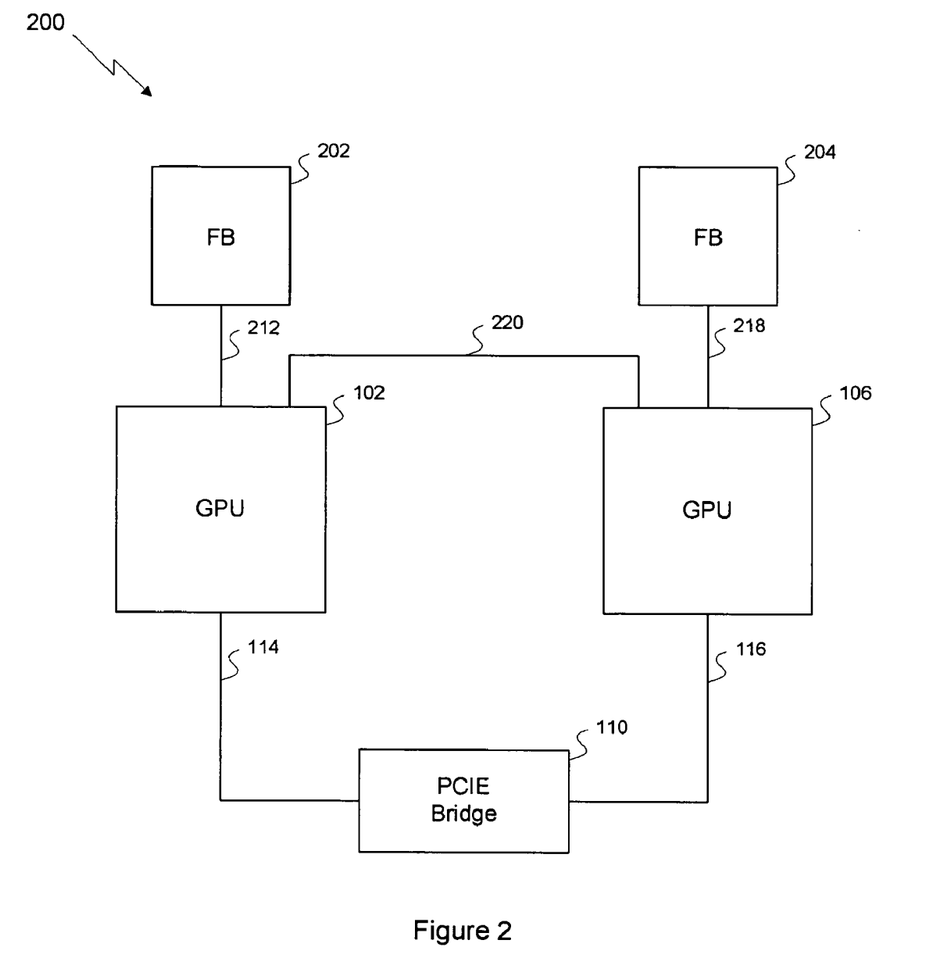
FIG. 2 illustrates a graphics system that includes two GPUs advantageously configured to communicate over an inter-GPU private bus, according to one embodiment of the invention.

FIG. 2 illustrates a graphics system 200 that includes two GPUs 102,106 advantageously configured to communicate over a private bus 220, according to one embodiment of the invention. As described in greater detail below in FIG. 5, the private bus 220 is formed by splitting each of the memory interfaces of GPUs 102,106 into two parts. The first part of the memory interface of GPU 102 is configured as a memory bus 212 that couples GPU 102 to a frame buffer 202, and the first part of the memory interface of GPU 106 is configured as a memory bus 218 that couples GPU 106 to a frame buffer 204. Each of memory busses 212, 218 has a bandwidth of approximately 75 GB/s. The second part of the memory interface of each of GPUs 102,106 is configured as the private bus 220, which has a bandwidth of approximately 25 GB/s. Importantly, each of frame buffers 202, 204 is about 75% of the size of frame buffers 104,108 of FIG. 1. Thus, the cost of graphics system 200 may be approximately 12.5% less than the cost of graphics system 100.

As previously described, although the 25 GB/s bandwidth provided by private bus 220 is superior to the approximately 5 GB/s bandwidth provided by a conventional PCIE bus, such as PCIE busses 114,116, the bandwidth of private bus 220 may still be limiting for certain graphics applications. Therefore, graphics system 200 may be configured with various features to improve the effective bandwidth of the private bus 200 or to reduce the memory traffic between GPUs 102,106 transmitted over the private bus 200.

Figure 3:
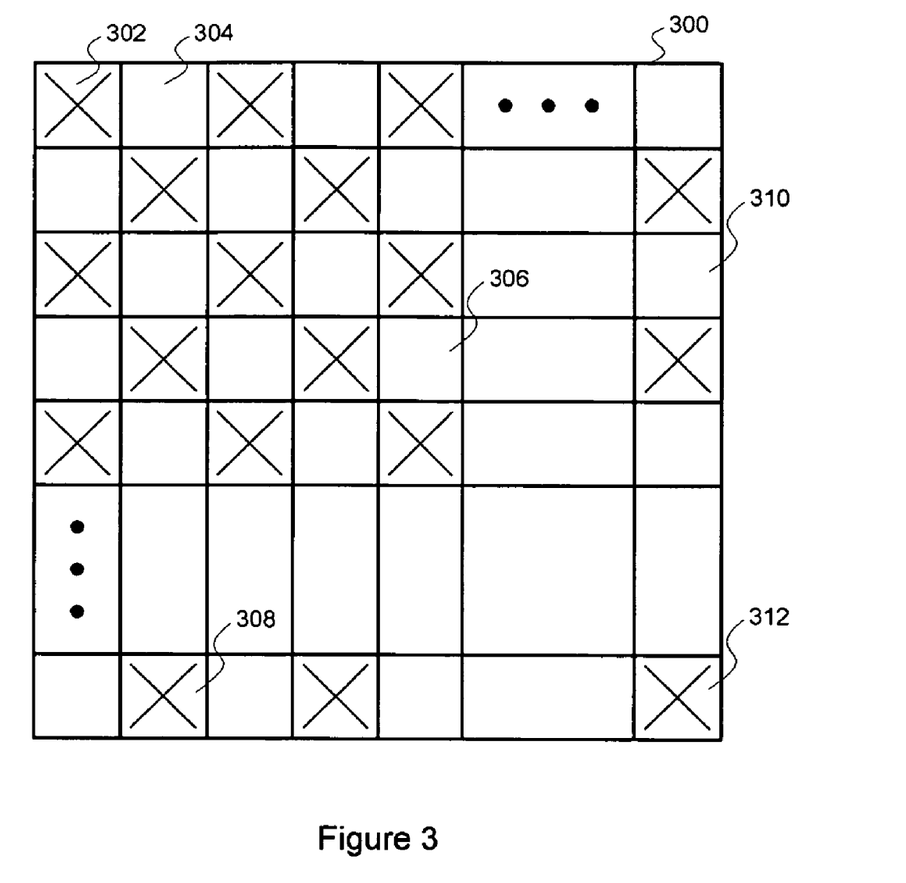
FIG. 3 illustrates an interleaved pattern of render targets, according to one embodiment of the invention.

The first feature is "render target interleaving." This technique involves partitioning the current frame being rendered into alternating tiles, where each tile is a small portion of the overall frame. The rendering computations for "odd" tiles are assigned to one GPU and the rendering computations for "even" tiles are assigned to the other GPU. As is well known, partitioning the current frame into tiles and assigning alternating tiles to different GPUs should produce reasonable load balancing between the two GPUs, since statistically the rendering workload between adjacent tiles should be similar. FIG. 3 illustrates an interleaved pattern of render targets, according to one embodiment of the invention. As shown, a frame 300 is split into a series of odd tiles (e.g., tiles 302, 308 and 312) and a series of even tiles (e.g., tiles 304, 306 and 310). In one embodiment, even tiles may be rendered by the GPU 102, while odd tiles may be rendered by the GPU 106. By dividing the rendering between GPUs 102,106 in this fashion, the computational performance of graphics system 200 may be upwards of 100% faster than that of a single GPU system. Further, since render target interleaving displays better load balancing characteristics than prior art approaches, such as SLI-based SFR, the performance of graphics system 200 should not be substantially reduced by disproportionate load balancing.

The second feature is static textures and render-to-texture data duplication. The principle behind this feature is to keep copies of some or all of the data rendered locally by each GPU in the frame buffer of the other GPU so that the data rendered by each GPU can be used as texture data by the other GPU. By keeping the data rendered by each GPU local to the other GPU, this data does not have to be transferred continually between the GPUs 102,106 via the private bus 220 during a texture operation. In a first embodiment, a copy of the data rendered by each GPU is duplicated in the frame buffer of the other GPU. For example, the tiles rendered by the GPU 102 are stored in the frame buffer 204, and the tiles rendered by the GPU 106 are stored in the frame buffer 202. Although render data duplication substantially reduces texture traffic across the private bus 220 relative to traffic in an unduplicated design, maintaining a full copy of the data rendered by each GPU in the frame buffer of the other GPU uses a large amount of memory in the frame buffers, thereby necessitating somewhat larger frame buffers and increasing relative overall cost. Additionally, maintaining full and current copies in each frame buffer of all data rendered by the other GPU may cause increased memory traffic through the dedicated bus 220 when the render-to-texture data stored in each frame buffer is updated. However, despite these issues, the simplicity of maintaining full copies of all texture information in both frame buffers is attractive.

Figure 4:
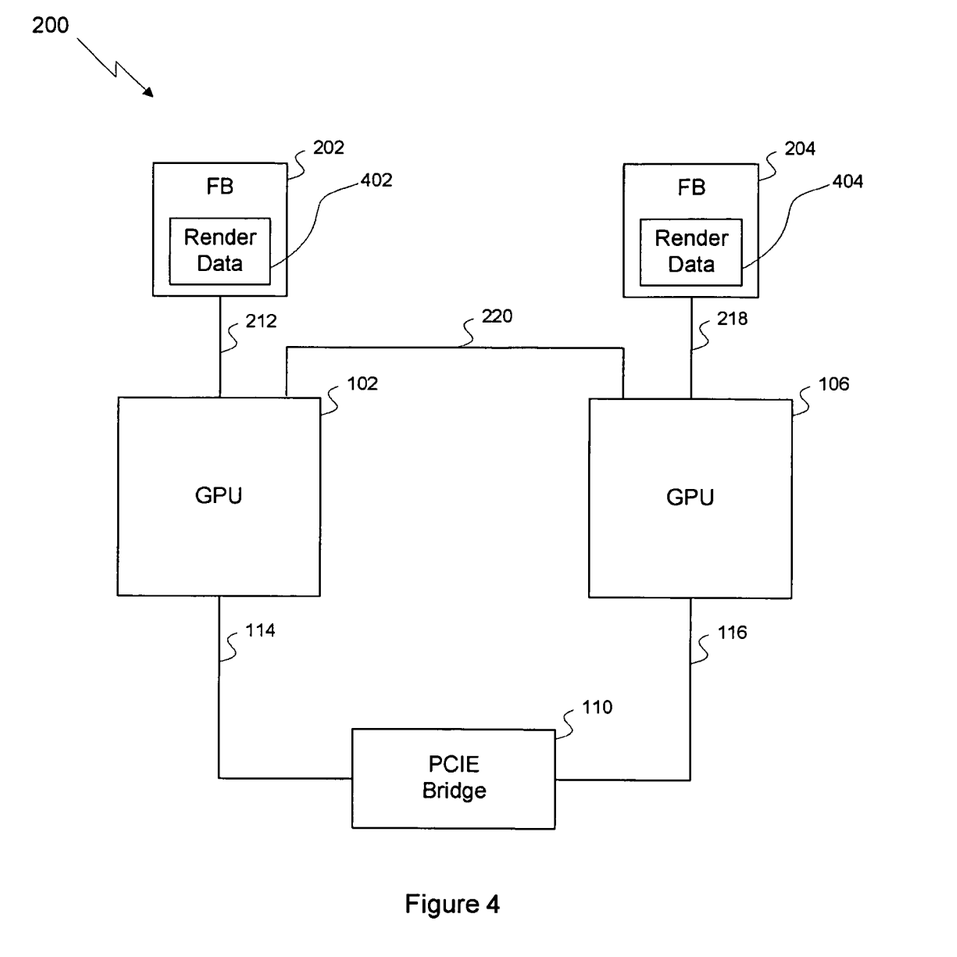
FIG. 4 illustrates the graphics system of FIG. 2 where copies of some or all of the data rendered locally by each GPU are stored in the frame buffer of the other GPU, according to one embodiment of the invention.

In a second, a copy of a portion of the data rendered by each GPU is stored in a cache within the frame buffer of the other GPU. In this form of render-to-texture caching, older or less recently used render data from one GPU may be replaced in the local cache of the other GPU with newer or more recently used render data. Since algorithms for replacing older or less frequently used cache data with newer or more frequently used cache data are well known to those skilled in the art, such algorithms will not be discussed here. FIG. 4 illustrates the graphics system of FIG. 2 where copies of some or all of the data rendered locally by each GPU are stored in the frame buffer of the other GPU. As shown, a cache 402 within the frame buffer 202 stores duplicate render data from the frame buffer 204 and a cache 404 within the frame buffer 204 stores duplicate render data from the frame buffer 202. Again, the frame buffer memory available for other purposes by GPUs 102,106 is reduced by the amount of memory utilized in frame buffers 202, 204 for render-to-texture caches 402, 404, respectively. Although this form of render-to-texture caching may increase the complexity of the control logic for the private bus interface due to the inclusion of cache replacement logic, limiting a copy of the data rendered by each GPU in the frame buffer of the other GPU to newer or recently used render data reduces the requirement for larger frame buffers relative to maintaining full copies in the other GPU's frame buffer. Additionally, caching newer or more recently used render data may reduce the memory traffic through the dedicated bus 220 due to maintaining the smaller, cached render data relative to maintaining full render data copies. In light of these advantages, maintaining copies of newer or more recently used texture information in both frame buffers may be more attractive than maintaining full copies of all texture information in both frame buffers.

The third feature is compressing render-to-texture data before transmitting it through the dedicated bus 220. This feature has the potential to substantially improve the effective bandwidth of the dedicated bus 220 by reducing the actual volume of data transmitted through that bus. Additionally, the format of the compressed render-to-texture data lends itself well to storage in either a full copy of render data or a render data cache, thereby reducing storage requirements if a copy of all the data rendered by each GPU is maintained in the frame buffer of the other GPU or if a render data cache is maintained in the frame buffer of the other GPU. One example of a compression scheme that can be used to compress data transmitted over a private bus 220 is set forth in application Ser. No. 11/448,383 titled, "Pixel Compression," filed on Jun. 6, 2006.

The fourth feature is "variable length packet protocol." This feature increases the effective bandwidth of private bus 220 by more efficiently utilizing the DRAM interface that makes up the private bus 220. Since graphics data transfers between GPUs tend to involve blocks of data rather than single bytes of data, the size of these transfers allows variable-length packets to be transferred as single operations rather than transferring each byte or word individually. Although variable-length packets may utilize a header to convey formatting information about the packet, including the size and starting address of the memory block to the receiving GPU, variable length packets may allow substantially higher effective bandwidth on the private bus 220, relative to single byte or words transfers, thereby improving the overall performance of the graphics system 200. Since the methods and techniques for transferring blocks of data as variable-length packets is well known to those skilled in the art, the details of this feature will not be discussed here. Additionally, using variable length packets on the private bus 220 may allow better utilization of the bandwidth of the DRAM interface, which is often limited to 80-85% of the theoretical bus bandwidth due to issues such as DRAM precharge timing and DRAM data bus turn-around time. Since variable length packets are not subject to the timing restrictions that DRAM memories are subject to, the bandwidth of transfers over the private bus 220 may exceed the 80-85% bus utilization that is common in DRAM memory transfers.

Figure 5:
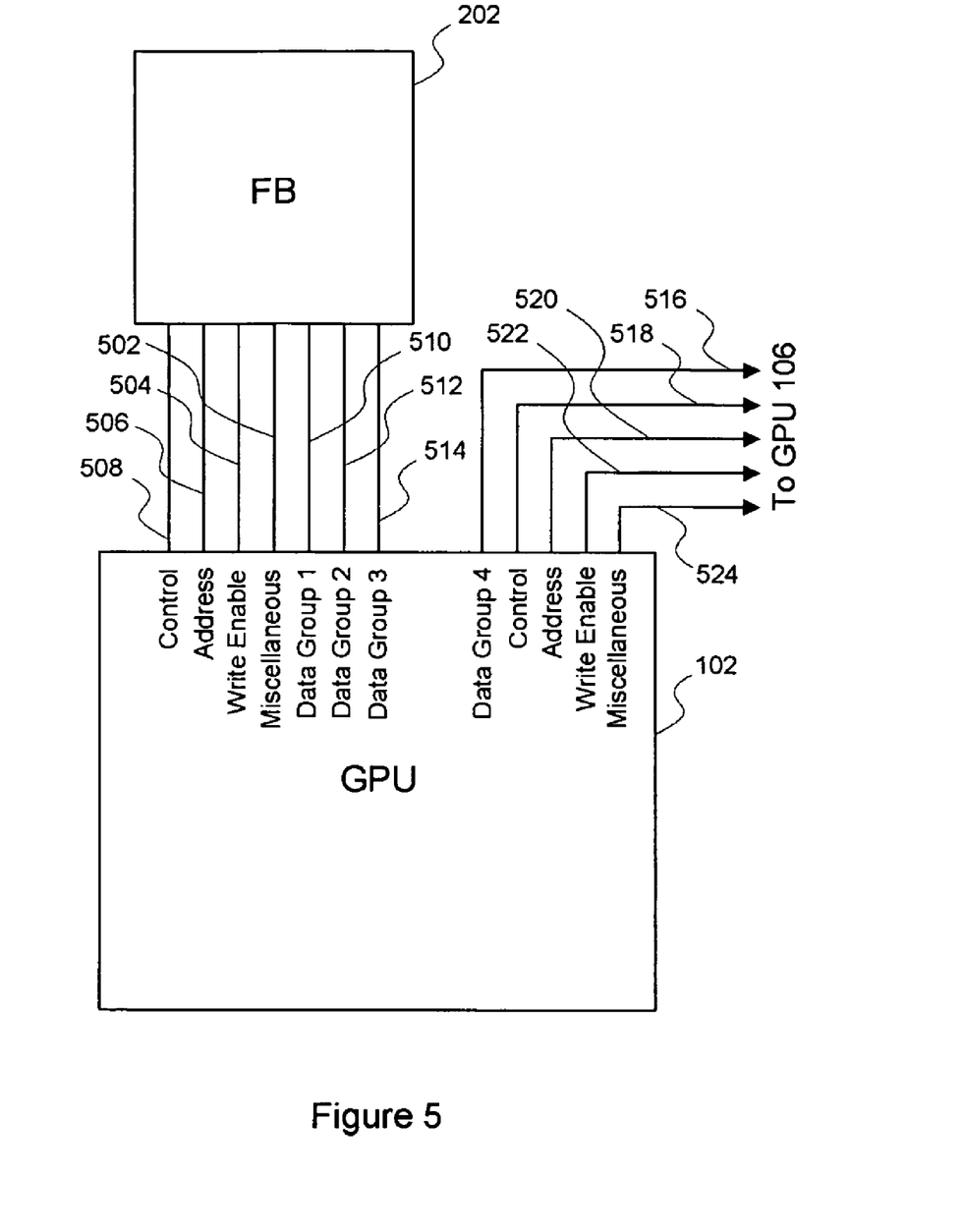
FIG. 5 illustrates the graphics system of FIG. 2 where the non-data pins of the DRAM interface improve the bandwidth of the private bus, according to one embodiment of the invention.

The fifth feature utilizes the non-data pins in the existing memory interface for transmitting data, thereby increasing the width of the private bus. When interfacing to a DRAM, these non-data pins are typically used to transmit address, write enable, control and miscellaneous information to the DRAM during memory transfer operations. However, since the bandwidth packing technique advantageously utilizes the private bus 220 for packet transfers rather than for byte or word transfers, the non-data pins in the memory interface may be idle because control-related information (e.g., packet identifying information and packet length) may be efficiently included in the header of the packet as previously described. For these reasons, the idle memory interface signals may be advantageously used for data transfers, increasing the bandwidth of the private bus 220 beyond 25 GB/s. FIG. 5 illustrates the graphics system of FIG. 2 utilizing DRAM interface non-data pins to improve the bandwidth of the private bus 220, according to one embodiment of the invention. As shown, the interface between the GPU 102 and the frame buffer 202 includes three groups of data signals, a first data group 510, a second data group 512 and a third data group 514. Additionally, this interface includes address signals 506, control signals 508, write enable signals 504 and miscellaneous signals 502. The interface between the GPU 102 and the GPU 106 includes a fourth group of data signals 516, control signals 518, address signals 520, write enable signals 522 and miscellaneous signals 524. As previously described, using some or all of the non-data signals between the GPU 102 and the GPU 106 for data transmission may substantially increase the bandwidth of the private bus 220.

The sixth feature pertains to storing all vertex data, other geometry data and geometry-related push buffer commands, if applicable, in the frame buffer of each GPU. Storing this information in the frame buffer of each GPU allows each GPU to execute all of the push buffer commands on the vertex data and other geometry data locally rather than transmitting the data and commands relevant to each GPU over the private bus 220. Although storing copies of all vertex data, geometry data and geometry-related push buffer commands in each frame buffer may reduce the available frame buffer memory for other purposes and may result in redundant computation, as discussed below, the benefit of reduced traffic on the private bus 220 makes this feature attractive.

The seventh feature relates to the sixth feature and pertains to having each GPU perform all geometry processing, as opposed to trying to divide the geometry processing between the GPUs. As previously described, storing all vertex data, other geometry data and geometry-related push buffer commands in the frame buffer of each GPU reduces traffic on the private bus 220. Further, if both GPUs process all of the geometry data, then the costly bandwidth associated with sending processed geometry data over the private bus 220 related to the tiles that each GPU is ultimately responsible for rendering can be avoided. Each GPU simply discards the geometry data not used when rendering its respective tiles. Although duplicating the geometry processing across both GPUs increases the computational load of the GPUs, reducing the bandwidth on the private bus 220 makes this feature attractive.

Figure 6:
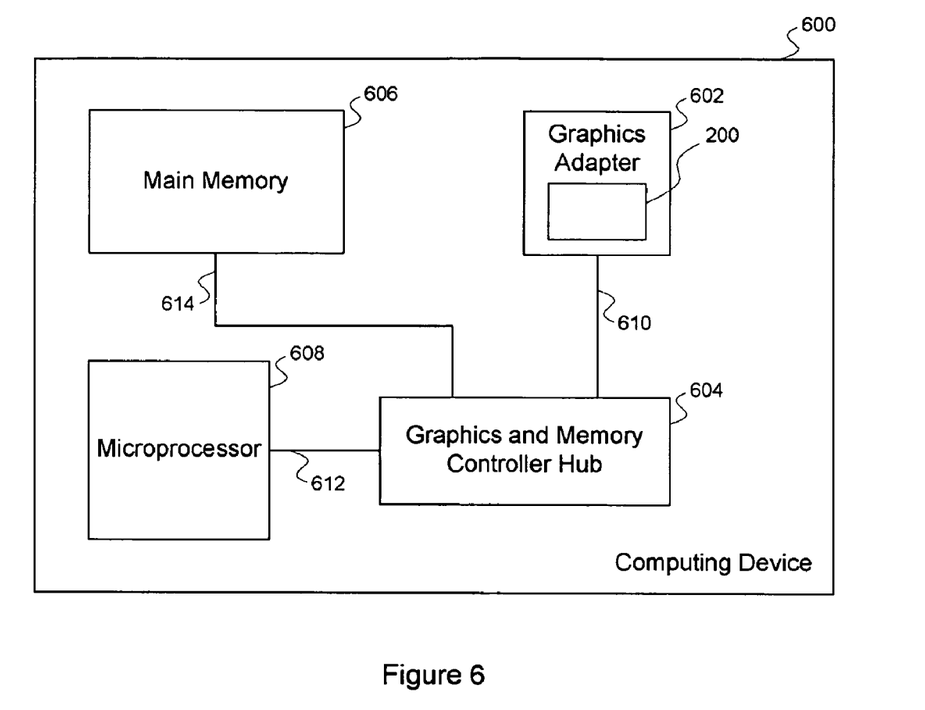
FIG. 6 illustrates a computing device in which one or more aspects of the invention may be implemented.

FIG. 6 illustrates a computing device 600 in which one or more aspects of the invention may be implemented. As shown, the computing device 600 includes a microprocessor 608, a main memory 606, a graphics adapter 602 and a graphics and memory controller hub 604. The graphics adapter 602 includes the graphics system 200. The graphics and memory controller hub 604 is coupled to the microprocessor 608, the main memory 606 and the graphics adapter 602 through hardware interfaces 612, 614 and 610, respectively. The computing device 600 may be a desktop computer, server, laptop computer, palm-sized computer, personal digital assistant, tablet computer, game console, cellular telephone, or any other type of similar device that processes information.

One advantage of the disclosed graphics system 200 is that its cost may be approximately 87.5% of the cost of the graphics system 100, due to the smaller frame buffers 202, 204 relative to the frame buffers 104, 108, while its performance may be between 135% and 150% of the performance of the graphics system 100, based on the aforementioned features of the graphics system 200. Thus, the cost-performance ratio of graphics system 200 may be much more favorable than that of similar multi-GPU SLI systems, such as graphics system 100. Another advantage of the disclosed graphics system 200 is that it is more scalable that an SLI system because the graphics bandwidth through the PCIE bus has been greatly reduced through use of private bus communications between pairs of GPUs. This architecture enables two GPUs to behave as one faster GPU, allowing the use of split-frame rendering and its problems to be avoided. Further, this architecture may allow a graphics system to include multiple pairs of GPUs, with intra-pair communications over intra-pair private busses and inter-pair communications over the PCIE bus. Thus, the graphics system 200 may be scaled beyond two GPUs more readily than the graphics system 100.

While the foregoing is directed to embodiments of the present invention, other and further embodiments of the invention may be devised without departing from the basic scope thereof. The scope of the present invention is determined by the claims that follow.

I claim:

1. A system for processing graphics data, comprising:
a first graphics processing unit supporting a first initial memory interface to communicate with a first frame buffer, wherein the first graphics processing unit is configured to store a set of vertex data and a set of push buffer commands in the first frame buffer and to process the vertex data by executing one or more of the push buffer commands;
a second graphics processing unit supporting a second initial memory interface to communicate with a second frame buffer, wherein the second graphics processing unit is also configured to store the set of vertex data and the set of push buffer commands in the second frame buffer and to process the vertex data by executing one or more of the push buffer commands; and
a private bus that couples the first graphics processing unit to the second graphics processing unit and includes a portion of the first initial memory interface and a portion of the second initial memory interface, wherein the first frame buffer stores a first set of rendered tiles, and the second frame buffer stores a second set of rendered tiles, and wherein the first frame buffer further stores a copy of at least one tile of the second set of rendered tiles, and the second frame buffer further stores a copy of at least one tile of the first set of rendered tiles.

2. The system of claim 1, wherein the first graphics processing unit communicates with the first frame buffer via a first reduced memory interface that occupies a remaining portion of the first initial memory interface, and the second graphics processing unit independently communicates with the second frame buffer via a second reduced memory interface that occupies a remaining portion of the second initial memory interface.

3. The system of claim 1, wherein the first frame buffer stores a copy of every tile in the second set of rendered tiles and the second frame buffer stores a copy of every tile in the first set of rendered tiles.

4. The system of claim 3, wherein the first graphics processing unit is configured to transmit a first tile in the first set of rendered tiles to the second graphics processing unit through the private bus upon updating the first tile, and the second graphics processing unit is configured to transmit a first tile in the second set of rendered tiles to the first graphics processing unit through the private bus upon updating the first tile.

5. The system of claim 4, wherein the first graphics processing unit is configured to compress the first tile in the first set of rendered tiles before transmitting the first tile through the private bus to the second graphics processing unit, and the second graphics processing unit is configured to compress the first tile in the second set of rendered tiles before transmitting the first tile through the private bus to the first graphics processing unit.

6. The system of claim 1, wherein the first frame buffer includes a first cache for storing the copy of the at least one tile of the second set of rendered tiles, and the second frame buffer includes a second cache for storing the copy of the at least one tile of the first set of rendered tiles.

7. The system of claim 6, wherein the first graphics processing unit is configured to transmit a first set of data to the second graphics processing unit through the private bus upon request for the first set of data by the second graphics processing unit to perform a texture operation on the first set of data, wherein the first set of data corresponds to the copy of the at least one tile of the first set of rendered tiles stored in the second cache, and the second graphics processing unit is configured to transmit a second set of data to the first graphics processing unit through the private bus upon request for the second set of data by the first graphics processing unit to perform a texture operation on the second set of data, wherein the second set of data corresponds to the copy of the at least one tile of the second set of rendered tiles stored in the first cache.

8. The system of claim 7, wherein the first graphics processing unit is configured to compress the first set of data before transmitting the first set of data through the private bus to the second graphics processing unit, and the second graphics processing unit is configured to compress the second set of data before transmitting the second set of data through the private bus to the first graphics processing unit.

9. The system of claim 1, wherein the portion of the first initial memory interface and the portion of the second initial memory interface included as part of the private bus have a plurality of non-data pins configured to transmit data traffic between the first graphics processing unit and the second graphics processing unit.

10. The system of claim 1, wherein variable length packets are used to transmit data traffic between the first graphics processing unit and the second graphics processing unit through the private bus.

11. A computing device configured to process graphics data, comprising:
- a central processing unit;
- a system memory;
- a first graphics processing unit supporting a first initial memory interface to communicate with a first frame buffer, wherein the first graphics processing unit is configured to store a set of vertex data and a set of push buffer commands in the first frame buffer and to process the vertex data by executing one or more of the push buffer commands;
- a second graphics processing unit supporting a second initial memory interface to communicate with a second frame buffer, wherein the second graphics processing unit is also configured to store the set of vertex data and the set of push buffer commands in the second frame buffer and to process the vertex data by executing one or more of the push buffer commands; and
- a private bus that couples the first graphics processing unit to the second graphics processing unit and includes a portion of the first initial memory interface and a portion of the second initial memory interface,
- wherein the first frame buffer stores a first set of rendered tiles, and the second frame buffer stores a second set of rendered tiles, and
- wherein the first frame buffer further stores a copy of at least one tile of the second set of rendered tiles, and the second frame buffer further stores a copy of at least one tile of the first set of rendered tiles.

12. The computing device of claim 11, wherein the first graphics processing unit communicates with the first frame buffer via a first reduced memory interface that occupies a remaining portion of the first initial memory interface, and the second graphics processing unit independently communicates with the second frame buffer via a second reduced memory interface that occupies a remaining portion of the second initial memory interface.

13. The computing device of claim 11, wherein the first frame buffer stores a copy of every tile in the second set of rendered tiles and the second frame buffer stores a copy of every tile in the first set of rendered tiles.

14. The computing device of claim 13, wherein the first graphics processing unit is configured to transmit a first tile in the first set of rendered tiles to the second graphics processing unit through the private bus upon updating the first tile, and the second graphics processing unit is configured to transmit a first tile in the second set of rendered tiles to the first graphics processing unit through the private bus upon updating the first tile.

15. The computing device of claim 14, wherein the first graphics processing unit is configured to compress the first tile in the first set of rendered tiles before transmitting the first tile through the private bus to the second graphics processing unit, and the second graphics processing unit is configured to compress the first tile in the second set of rendered tiles before transmitting the first tile through the private bus to the first graphics processing unit.

16. The computing device of claim 11, wherein the first frame buffer includes a first cache for storing the copy of the at least one tile of the second set of rendered tiles, and the second frame buffer includes a second cache for storing the copy of the at least one tile of the first set of rendered tiles.

17. The computing device of claim 16, wherein the first graphics processing unit is configured to transmit a first set of data to the second graphics processing unit through the private bus upon request for the first set of data by the second graphics processing unit to perform a texture operation on the first set of data, wherein the first set of data corresponds to the copy of the at least one tile of the first set of rendered tiles stored in the second cache, and the second graphics processing unit is configured to transmit second set of data to the first graphics processing unit through the private bus upon request for the second set of data by the first graphics processing unit to perform a texture operation on the second set of data, wherein the second set of data corresponds to the copy of the at least one tile of the second set of rendered tiles stored in the first cache.

18. The computing device of claim 17, wherein the first graphics processing unit is configured to compress the first set of data before transmitting the first set of data through the private bus to the second graphics processing unit, and the second graphics processing unit is configured to compress the second set of data before transmitting the second set of data through the private bus to the first graphics processing unit.

19. The computing device of claim 11, wherein the portion of the first initial memory interface and the portion of the second initial memory interface included as part of the private bus have a plurality of non-data pins configured to transmit data traffic between the first graphics processing unit and the second graphics processing unit.

20. The computing device of claim 11, wherein variable length packets are used to transmit data traffic between the first graphics processing unit and the second graphics processing unit through the private bus.

* * * * *